United States Patent
Jing et al.

(10) Patent No.: US 10,663,070 B2
(45) Date of Patent: May 26, 2020

(54) ELECTROMAGNETIC RELEASE FOR VALVE

(71) Applicant: EMERSON PROCESS MANAGEMENT REGULATOR TECHNOLOGIES, INC., McKinney, TX (US)

(72) Inventors: Chen Jing, Shanghai (CN); Li Li, Shanghai (CN)

(73) Assignee: EMERSON PROCESS MANAGEMENT REGULATOR TECHNOLOGIES, INC., McKinney, TX (US)

( * ) Notice: Subject to any disclaimer, the term of this patent is extended or adjusted under 35 U.S.C. 154(b) by 464 days.

(21) Appl. No.: 14/828,124

(22) Filed: Aug. 17, 2015

(65) Prior Publication Data

US 2016/0053914 A1    Feb. 25, 2016

(30) Foreign Application Priority Data

Aug. 22, 2014 (CN) .......................... 2014 1 0419836

(51) Int. Cl.
*F16K 17/36* (2006.01)
*F16K 31/56* (2006.01)
(Continued)

(52) U.S. Cl.
CPC .......... *F16K 17/363* (2013.01); *F16K 1/2007* (2013.01); *F16K 15/033* (2013.01);
(Continued)

(58) Field of Classification Search
CPC ........ F16K 1/20; F16K 1/2007; F16K 15/033; F16K 17/36; F16K 17/363; F16K 31/56;
(Continued)

(56) References Cited

U.S. PATENT DOCUMENTS

| 472,461 A | * | 4/1892 | Lundstedt | ............... F16K 31/10 |
| | | | | 126/285 B |
| 835,918 A | * | 11/1906 | Sabroe | .................... F16K 17/00 |
| | | | | 119/14.08 |

(Continued)

FOREIGN PATENT DOCUMENTS

| CN | 202048244 U | 11/2011 |
| CN | 102966769 A | 3/2013 |
| CN | 103742696 A | 4/2014 |

OTHER PUBLICATIONS

Search Report for PCT/US2015/045080 dated Oct. 26, 2015.

(Continued)

*Primary Examiner* — Mary E McManmon
*Assistant Examiner* — Richard K. Durden
(74) *Attorney, Agent, or Firm* — Marshall, Gerstein & Borun LLP

(57) ABSTRACT

An emergency shut-off valve assembly includes a valve having a closure assembly that includes a closure member coupled to an arm that rotates about a shaft. The valve assembly also includes an actuation assembly having a securement member coupled to the shaft; and an electromagnet adapted to generate a first magnetic force in a first state and a second magnetic force in a second state. In the first state, a contact surface of the securement member is in contact with and magnetically coupled to a contact surface of the electromagnet such that the closure member, the arm, and the shaft are maintained in the first open position against a rotational force provided by a biasing member. In the second state, the closure member, the arm, and the shaft are rotated into the second closed position by the rotational force provided by the biasing member.

10 Claims, 10 Drawing Sheets

(51) Int. Cl.
  *F16K 1/20* (2006.01)
  *F16K 31/524* (2006.01)
  *F16K 15/03* (2006.01)

(52) U.S. Cl.
  CPC ........ *F16K 31/52408* (2013.01); *F16K 31/56* (2013.01); *F16K 31/563* (2013.01); *F16K 1/20* (2013.01)

(58) Field of Classification Search
  CPC .... F16K 31/563; F16K 31/602; F16K 31/084; F16K 31/607; F16K 35/16; Y10T 137/1516; Y10T 137/1915; Y10T 137/7194; Y10T 137/7723
  USPC ... 251/65, 66, 68, 69, 129.16, 129.2, 89, 90, 251/92, 98, 99, 111
  See application file for complete search history.

(56) References Cited

U.S. PATENT DOCUMENTS

| | | | | |
|---|---|---|---|---|
| 2,570,593 A * | 10/1951 | Ray | ............ | F23N 5/107 137/456 |
| 2,674,255 A * | 4/1954 | Biggle | ............ | F23N 5/107 137/628 |
| 3,254,660 A * | 6/1966 | Ray | ............ | F16K 31/105 137/553 |
| 3,844,312 A | 10/1974 | Sumner et al. | | |
| 4,409,638 A * | 10/1983 | Sturman | ............ | H01H 47/226 251/129.16 |
| 4,913,398 A * | 4/1990 | Ziaylek, Jr. | ............ | F16K 31/521 251/144 |
| 5,209,454 A | 5/1993 | Engdahl et al. | | |
| 5,301,848 A * | 4/1994 | Conrad | ............ | A01C 7/105 111/903 |
| 5,915,668 A * | 6/1999 | Hodapp | ............ | F16K 31/563 251/129.12 |
| 6,837,474 B1 * | 1/2005 | DeJonge | ............ | F01D 17/24 251/66 |
| 2008/0041285 A1 * | 2/2008 | Nimberger | ............ | A01C 23/007 111/119 |
| 2013/0264504 A1 * | 10/2013 | Nimberger | ............ | F16K 31/105 251/129.03 |

OTHER PUBLICATIONS

Written Opinion for PCT/US2015/045080 dated Oct. 26, 2015.
"Type N550 D450040T012 Instruction Manual Type N550 Snappy Joe Emergency Shutoff Valves", Mar. 31, 2010 (Mar. 31, 2010), XP055221290, Retrieved from the Internet: URL:http://www.documentation.emersonprocess.com/groups/public/documets/instruction_manuals/d450040t012.pdf [retrieved on Oct. 15, 2015].
Office Action received for EP 15 756 280.2, dated Apr. 26, 2018.
Office Action issued in Chinese Patent Application No. 201410419836.5, dated May 27, 2019.
Office Action issued in European Patent Application No. 15756280.2, dated Jul. 18, 2019.

* cited by examiner

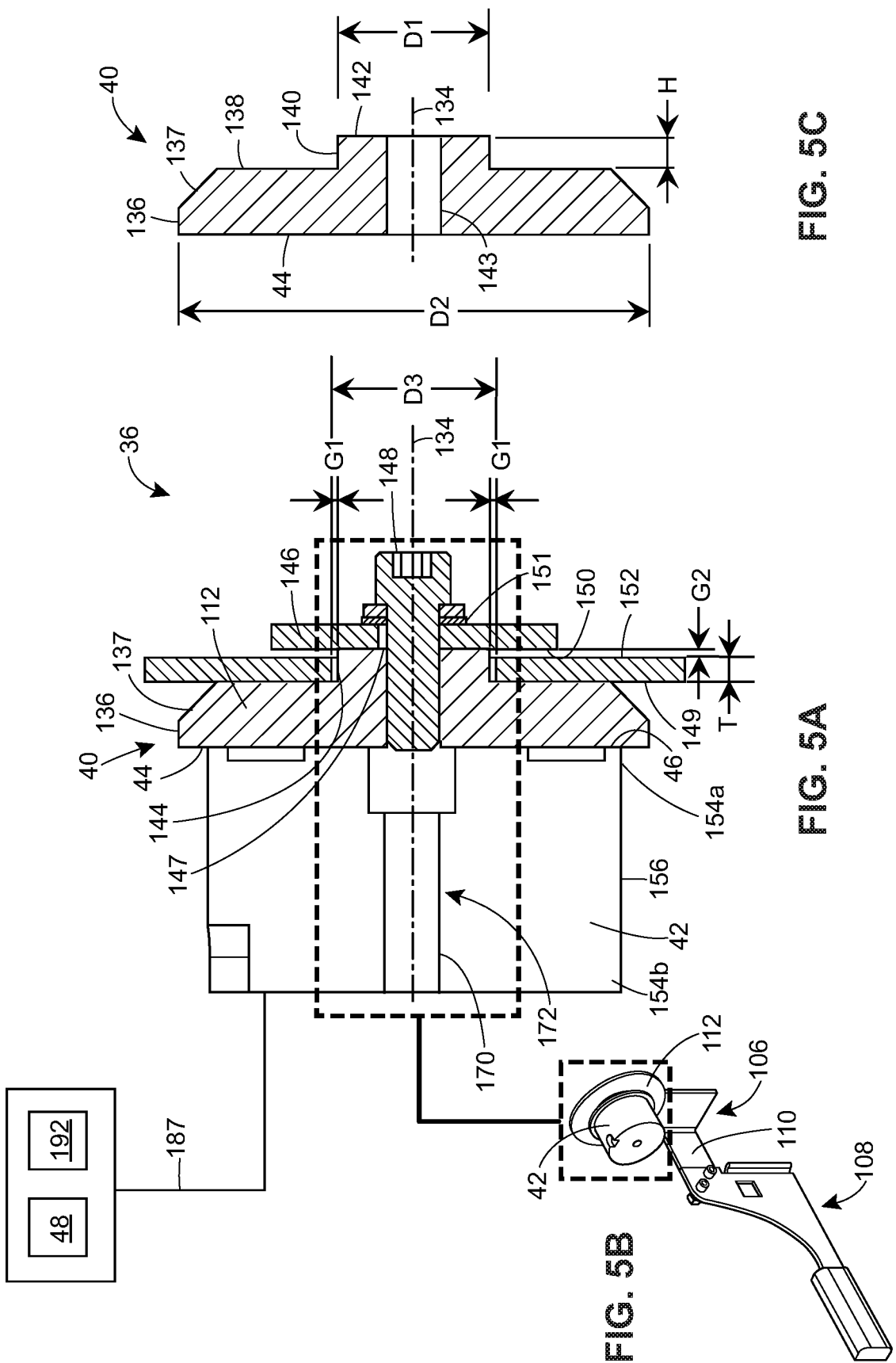

ELECTROMAGNETIC RELEASE FOR VALVE

FIELD OF THE DISCLOSURE

This disclosure relates generally to valve actuators and, more specifically, to an electromagnetic release mechanism for valves.

BACKGROUND

Gas distribution systems, in particular natural gas distribution systems, typically transport gas from a producer to a consumer along a series of pipes and through a series of valves. Each gas distribution system may include one or more regulator valves that control the pressure of the gas within the distribution system. Normally, the gas is transmitted at a high pressure through the system. However, the pressure of the gas must be reduced prior to final distribution to the consumers. This pressure reduction is typically accomplished at pressure reducing stations within local networks.

In many cases, these pressure reducing stations include some sort of safety device to shut off the flow of gas. Most commonly, emergency shut-off valves are used for this purpose. The emergency shut-off valve is generally disposed upstream of the pressure regulating valve so that the emergency shut-off valve may prevent gas from reaching the pressure regulating valve in the event of a problem. Typically, emergency shut-off valves have a closure member, such as a poppet, that is mounted on a rotatable shaft to move the poppet between an open position, which allows the flow of fluid through the valve, and a closed position, which prevents the flow of fluid through the valve. Generally, a spring acts on the shaft and the poppet to store rotational energy, and the spring rotates the shaft and poppet from the open position to the closed position, and a locking mechanism is used to maintain the poppet in the open position. When it is desired by a user to cut off flow through the emergency shut-off valve, the locking mechanism is disengaged by manually displacing a cable coupled to the locking mechanism. With the locking mechanism disengaged, the stored rotational energy of the spring quickly rotates the shaft and poppet from the open position to the closed position, thereby cutting off flow through the emergency shut-off valve.

BRIEF SUMMARY OF THE DISCLOSURE

In accordance with one exemplary aspect of the present invention, an emergency shut-off valve assembly includes a valve body defining an inlet, an outlet, and a fluid passageway between the inlet and the outlet. The emergency shut-off valve assembly also includes a valve closure assembly positioned at least partially within the valve body, and the valve closure assembly includes a shaft rotatably coupled to the valve body and having a shaft longitudinal axis. The valve closure assembly also includes an arm coupled to the shaft, a closure member coupled to the arm, and a biasing member coupled to the arm or the closure member. The arm, the closure member, and the shaft rotate about the shaft longitudinal axis from a first open position in which the closure member is offset from a valve seat coupled to the valve body and a second closed position in which the closure member sealingly engages the valve seat such that fluid is prevented from flowing through the fluid passageway from the inlet to the outlet. The emergency shut-off valve assembly further includes a valve actuation assembly adapted to rotate the arm, the closure member, and the shaft from the first open position to the second closed position, and the valve actuation assembly includes a securement member coupled to the shaft and an electromagnet adapted to generate a first magnetic force in a first state and a second magnetic force in a second state, and the first magnetic force is greater than the second magnetic force. In the first state, a contact surface of the securement member is in contact with and magnetically coupled to a contact surface of the electromagnet such that the closure member, the arm, and the shaft are maintained in the first open position against a rotational force provided by the biasing member. In the second state, the closure member, the arm, and the shaft are rotated into the second closed position by the rotational force provided by the biasing member.

BRIEF DESCRIPTION OF THE DRAWINGS

FIG. 5A is a side cross-sectional view of an embodiment of an electromagnet and a securement member of an embodiment of an emergency shut-off valve assembly in an open position;

FIG. 5B is a perspective view of an embodiment of valve actuation assembly of an embodiment of an emergency shut-off valve assembly in an open position (with the valve body omitted for clarity);

FIG. 5C is a side cross-sectional view of an embodiment of a securement member;

DETAILED DESCRIPTION

Figure 1:
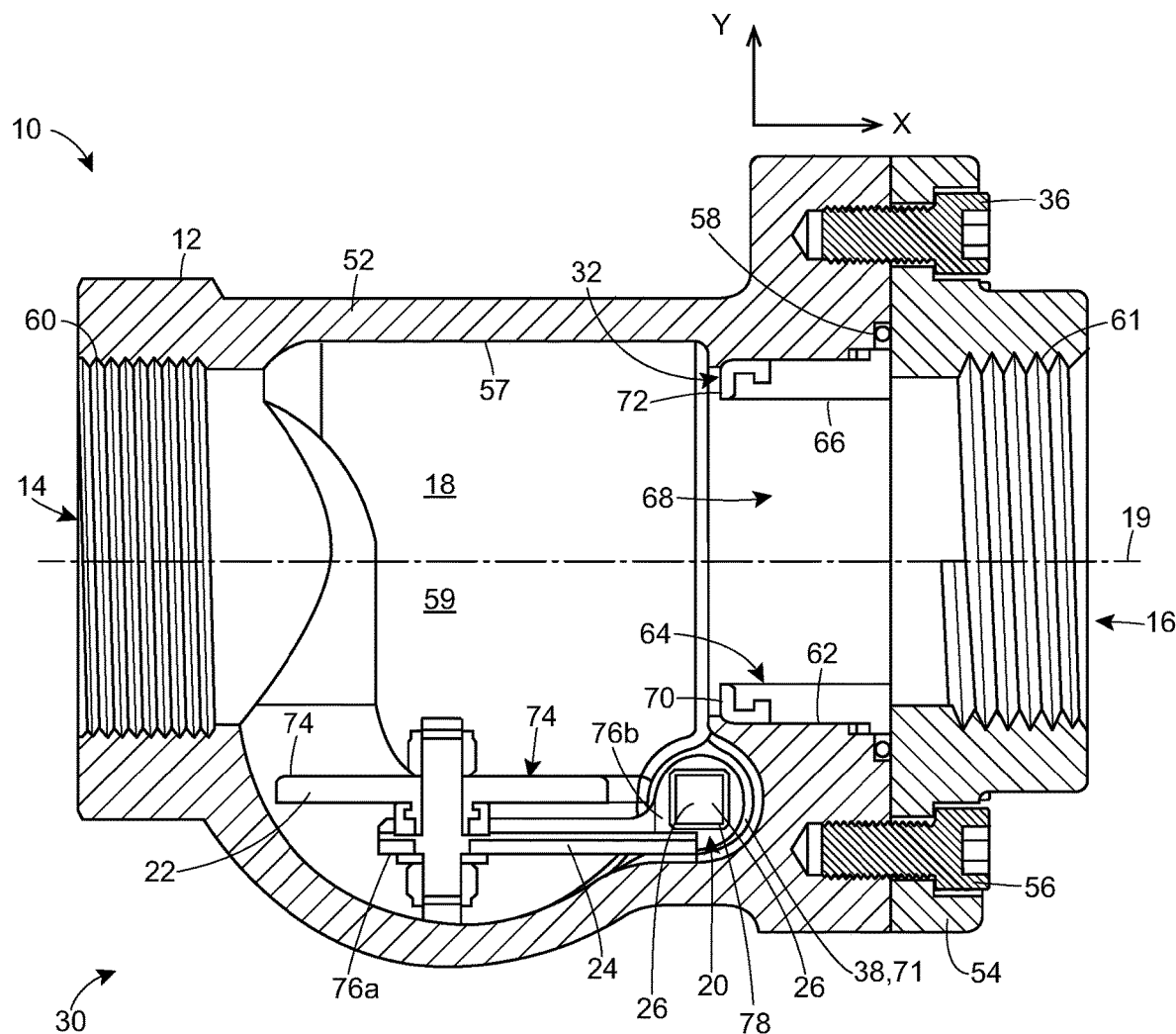
FIG. 1 is a side cross-sectional view of an embodiment of an emergency shut-off valve assembly in an open position.

Referring to FIG. 1, an emergency shut-off valve assembly 10 includes a valve body 12 defining an inlet 14, an outlet 16, and a fluid passageway 18 between the inlet 14 and the outlet 16. The emergency shut-off valve assembly 10 also includes a valve closure assembly 20 positioned at least partially within the valve body 12, and the valve closure assembly 20 includes a shaft 26 rotatably coupled to the valve body 12 and having a shaft longitudinal axis 28

Figure 2:
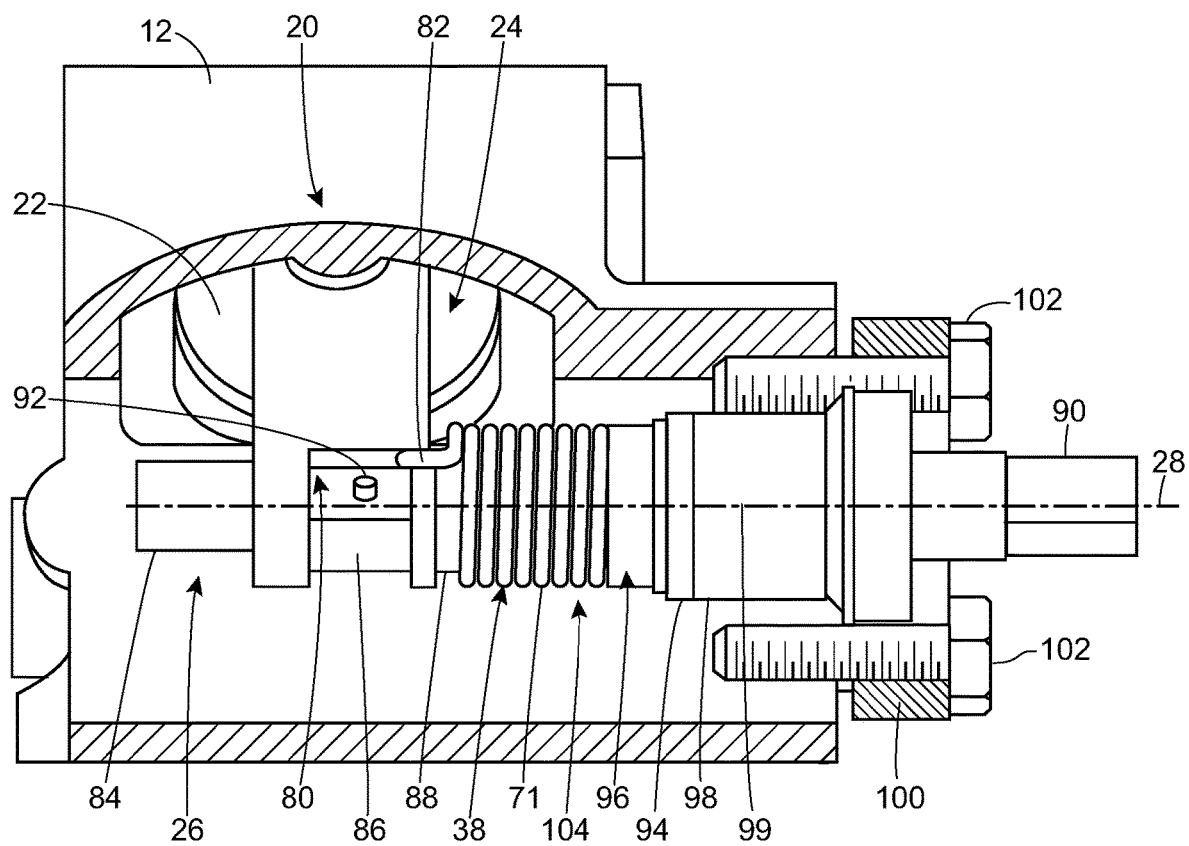
FIG. 2 is a bottom partial cross-sectional view of the example emergency shut-off valve assembly of FIG. 1.

(shown in FIG. 2). Referring to FIGS. 1 and 2, the valve closure assembly 20 also includes an arm 24 coupled to the shaft 26, a closure member 22 coupled to the arm 24, and a biasing member 38 coupled to the arm 24 or the closure member 22. The arm 24, the closure member 22, and the shaft 26 rotate about the shaft longitudinal axis 28 from a first open position 30 (illustrated in FIG. 1) in which the closure member 22 is offset from a valve seat 32 coupled to the valve body 12 and a second closed position 34 (illustrated in FIG. 7) in which the closure member 22 sealingly engages the valve seat 32 such that fluid is prevented from flowing through the fluid passageway from the inlet 14 to the outlet 16. In addition, the biasing member 38 may provide a rotational force that tends to rotate the arm 24, the closure member 22, and the shaft 26 from the first open position 30 to the second closed position 34.

Figure 3:
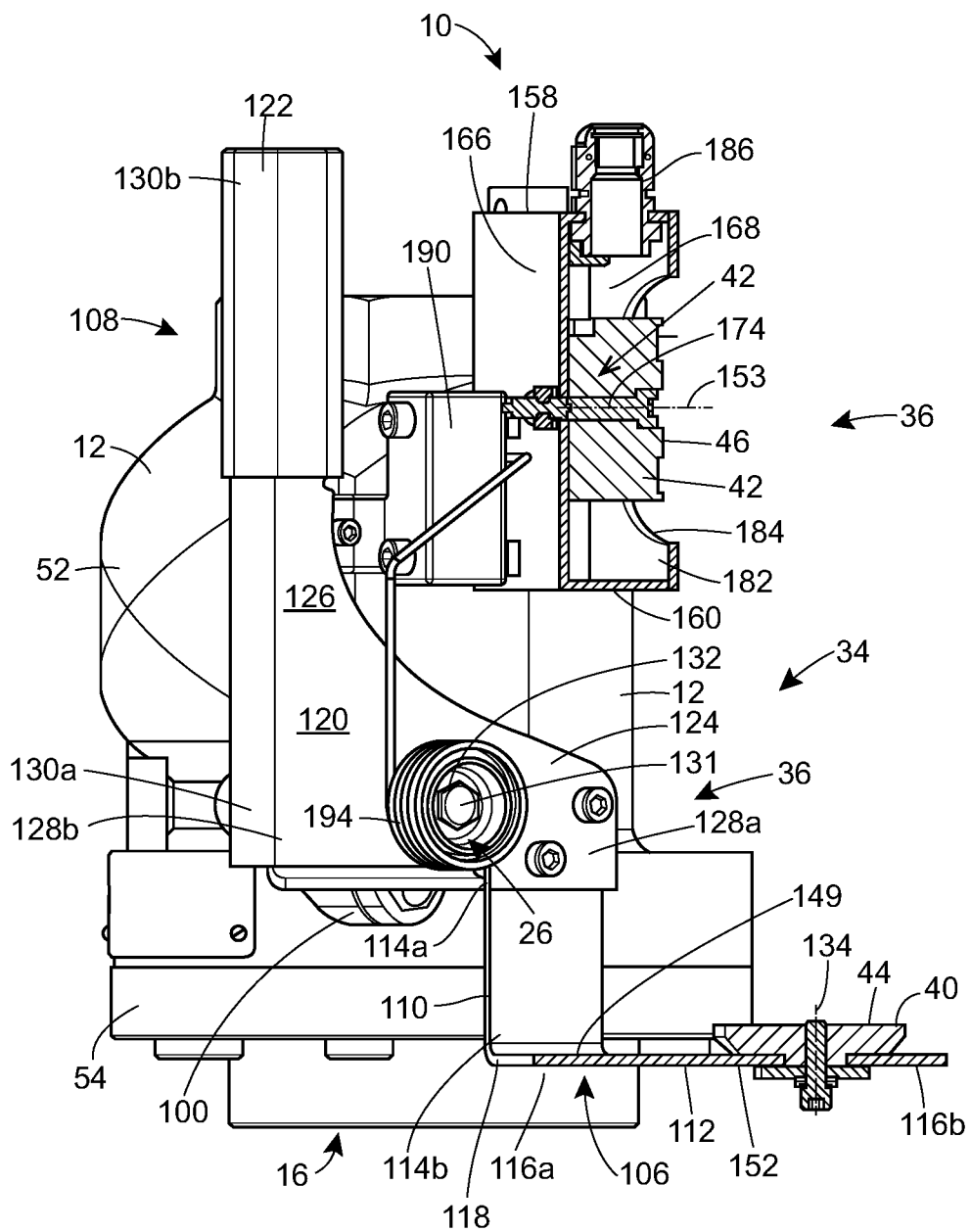
FIG. 3 is a perspective view of an embodiment of an emergency shut-off valve assembly in a closed position.

Referring to FIG. 3, the emergency shut-off valve assembly 10 further includes a valve actuation assembly 36 adapted to rotate the arm 24 and closure member 22 from the first open position 30 (illustrated in FIG. 1) to the second closed position 34 (illustrated in FIG. 7), and the valve actuation assembly 36 includes a securement member 40 coupled to the shaft 26 and an electromagnet 42 adapted to generate a first magnetic force in a first state and a second magnetic force in a second state, and the first magnetic force is greater than the second magnetic force. In the first state, a contact surface 44 of the securement member 40 is in contact with and magnetically coupled to a contact surface 46 of the electromagnet 42 such that the closure member 22, the arm 24, and the shaft 26 (illustrated in FIGS. 1 and 2) are maintained in the first open position 30 against a rotational force provided by the biasing member 38 (illustrated in FIGS. 1 and 2). In the second state, the closure member 22 and arm 24 are rotated into the second closed position 34 (illustrated in FIG. 7) by the rotational force provided by the biasing member 38.

Figure 4:
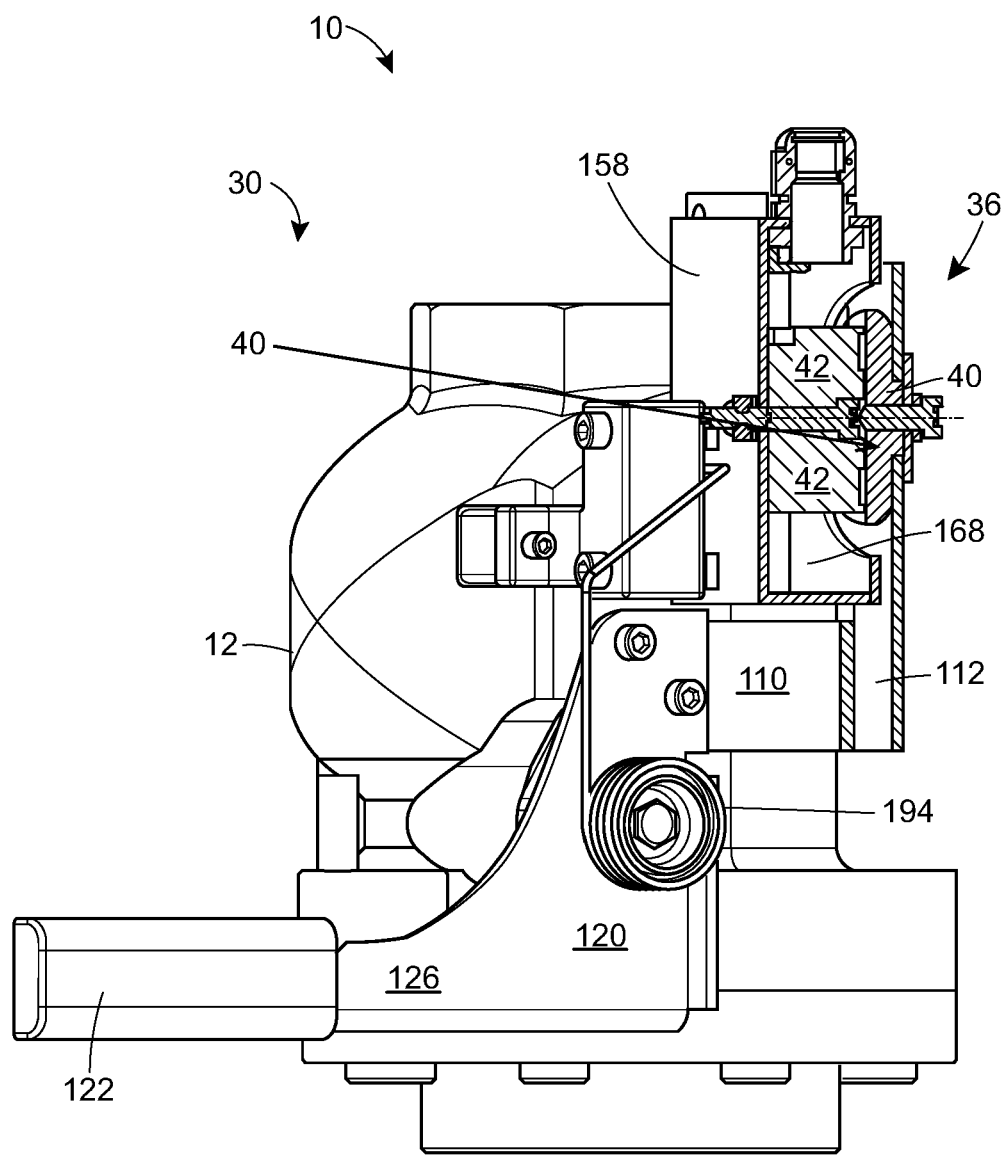
FIG. 4 is a perspective view of the embodiment of FIG. 3 in an open position.

So configured, and referring to FIG. 4, the valve actuation assembly 36 cooperates to maintain the arm 24, the closure member 22, and the shaft 26 in the first open position 30 when the electromagnet is in the first state. When the electromagnet 42 is changed from the first state to the second state, such as by actuating a switch 48 (see FIG. 5A) by a user, the second magnetic force acting on the securement member 40 is not strong enough to resist the rotational biasing force provided by the biasing member 38, and the biasing member 38 rotates the arm 24 and the closure member 22 in the second closed position 34, as shown in FIG. 3. Such a configuration allows a user to nearly instantaneously cut off fluid flow through the valve body 12 by the actuation of the switch 48, which may by remotely activated, for example. The electromagnet 42 may also be changed from the first state to the second state automatically without user interventions, such as by the loss of power supplied to the electromagnet 42.

Turning to the emergency shut-off valve assembly 10 in more detail, the valve body 12 may include the fluid passageway 18 that extends from the inlet 14 to the outlet 16, and the fluid passageway 18 may extend along a substantially linear flow axis 19, as illustrated in FIG. 1. The flow axis 19 may extend parallel to or substantially parallel to the X-axis of the reference coordinate system of FIG. 1. The valve body 12 may include a first portion 52 and a second portion 54 secured to the first portion 52. The second portion 54 may be secured to the first portion 52 in any suitable manner. For example, the second portion 54 may be secured to the first portion 52 by two or more threaded members 56. A seal 58, such as an O-ring, may be positioned between the first portion 52 and the second portion 54 to prevent leakage from valve body 12. The valve body 12 may include one or more interior surfaces 57 that cooperate to define an interior portion 59 of the valve body 12, and the fluid passageway 18 may also be defined by the one or more interior surfaces 57. The first portion 52 may have a threaded portion 60 that defines a portion of the inlet 14, the second portion 54 may have a threaded portion 61 that at least partially defines the outlet 16, and a portion of the fluid passageway 18 may include a throat portion 62 disposed in the first portion 52 between the inlet 14 and the outlet 16. The throat portion 62 may be substantially cylindrical, and may be disposed adjacent to the second portion 54.

Still Referring to FIG. 1, an insert 64 may be disposed within the throat portion 62 of the first portion 52 of the valve body 12 and may include a bore 66 that defines a valve port 68. The valve seat 32, such as a seal 70, may be secured to or formed at an end of the insert 64 to provide a seating surface 72 to engage a corresponding sealing surface 74 of the closure member 22 of a valve closure assembly 20, as described in more detail below.

Referring to FIGS. 1 and 2, the valve closure assembly 20 may include the closure member 22, the shaft 26, the biasing member 38, and the arm 24. The sealing surface 74 of the closure member 22 may engage the seating surface 72 of the seal 70 coupled to the insert 64 when the emergency shut-off valve assembly 10 is in the second closed position 34 illustrated in FIG. 7. As illustrated in FIG. 1, the closure member 22 may have any suitable shape, such as that of a disc, and the sealing surface 74 may be an annular outer perimeter portion of the disc. The arm 24 may be elongated and have a first end 76a coupled to the closure member 22 and a second end coupled to the shaft 26. For example, the arm 24 may have an aperture a second end coupled to the shaft 26. The arm 24 may have an aperture 78 to receive a portion of the shaft 26, and a window 80 intersecting the aperture 78 to provide access to the portion of the shaft 26 and to receive a first end 82 of the biasing member 38. The aperture 78 may be polygonal, such as a square, and may receive a corresponding polygonal portion of the shaft 26 such that closure member 22 rotates with shaft 26.

As illustrated in FIG. 2, the shaft 26 may be elongated and may extend along the shaft longitudinal axis 28. The shaft longitudinal axis 28 may extend normal to or substantially normal to the X-Y plane of the reference coordinate system of FIG. 1. Referring to FIG. 2, the shaft 26 may have a first end 84 and a longitudinally-opposite second end 90. The shaft 26 may also include a polygonal first intermediate portion 86 disposed between the first and second ends 84, 90 and configured to receive and engage the arm 24 through the aperture 78 at the second end 76b of the arm 24. The shaft may also include a generally cylindrical second intermediate portion 88 disposed between the first intermediate portion 86 and the second end 90 and configured to be surrounded by the biasing member 38. The second end 90 may be configured to engage a portion of the valve actuation assembly 36, as will be described in more detail. In some embodiments, the first intermediate portion 86 of the shaft 26 may be square and may be received in the aperture 78 of the arm 24 to operatively couple closure member 22 to shaft 26 such that closure member 22 rotates about the shaft 26 as the shaft 26 is rotated. An aperture (not shown) may be formed in the first intermediate portion 86 of the shaft 26 and may be configured to receive a retaining member 92, such as a spring pin, screw, pin, clip, or other retaining device, which extends into the window 80 in the arm 24 to prevent the closure member 22 from sliding off the shaft 26 during assembly, operation, or maintenance of the emergency shut-off emergency shut-off valve assembly 10. The second intermediate portion 88 of the shaft 26 may be inserted through and rotatable within the biasing member 38 and a gland 94 and, a follower and packing (not shown) may be positioned between the shaft 26 and the gland 94 to allow rotation of and prevent leakage between the shaft 26 and the gland 94. A spring (not shown) may also be positioned within gland 94 and around shaft 26 to compress the packing.

Still referring to FIG. 2, the gland 94 may have a generally cylindrical body 99 sized to fit within an aperture 98 in the valve body 12 and a bore (not shown) through the body 99 may be sized to receive the second intermediate portion 88 of shaft 26. A portion of the body 99 may also receive a second end 96 of the biasing member 38. A retaining plate 100 may be disposed adjacent to an end portion of the aperture 98 in the valve body 12 and two or more fasteners 102 may secure the retainer 98 to the valve body 12, thereby fixing the body 99 of the gland 94 within the aperture 98 in the valve body 12 in a known manner.

Figure 7:
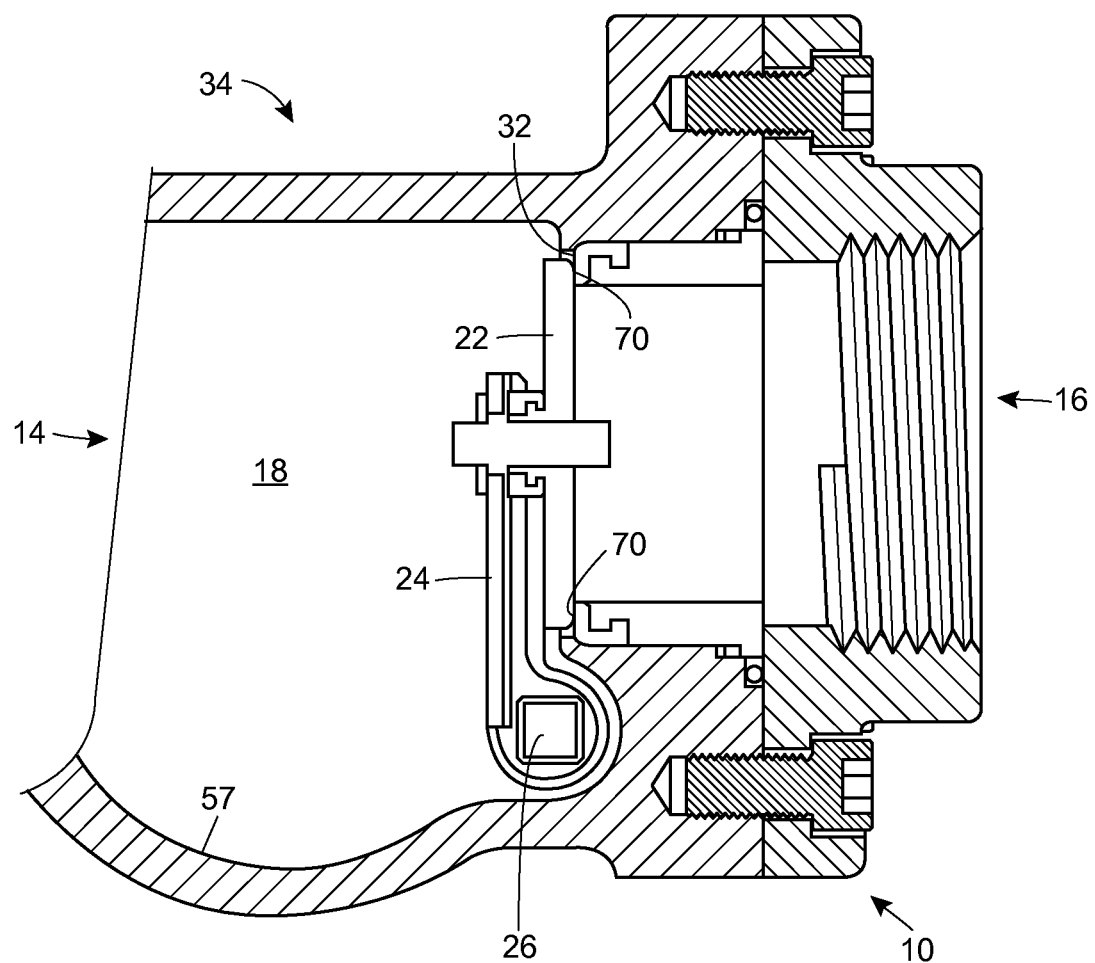
FIG. 7 is a partial side cross-sectional view of the embodiment of FIG. 1 in a closed position.

The biasing member 38 of the valve closure assembly 20 may be any suitable spring that is capable of biasing the shaft 26, the arm 24, and the closure member 22 in the first open position 30 and capable of rotating the shaft 26, the arm 24, and the closure member 22 from the first open position 30 to the second closed position 34. For example, as illustrated in FIG. 2, the biasing member 38 may be a torsional spring 71 that may have a generally cylindrical portion 104 that may be positioned around a portion of the shaft 26, such as, e.g., the second intermediate portion 88. The second end 96 of biasing member 38 (e.g., the torsional spring 71) may extend from one end of cylindrical portion 104 and be positioned in a slot (not shown) in the gland 94, which keeps the second end 96 stationary as the shaft 26 rotates and the closure member 22 displaces. The first end 82 of the biasing member 38 (e.g., the torsional spring 71) may extend from an opposite longitudinal end of the cylindrical portion 104 and may positioned within the window 80 in the arm 24 coupled to the closure member 22 to bias the closure member 22 into the second closed position 34 in which the sealing surface 74 of the closure member 22 engages the seating surface 72 of the seal 70 secured to the insert 64 (as illustrated in FIGS. 1 and 7). Alternatively, the first end 82 of the biasing member 38 may engage the arm 24 in any other suitable manner, such as by resting in a groove, inserted into an aperture, etc., as long as the biasing member 38 biases the closure member 22 into the second closed position 34. As the shaft 26 is rotated and the closure member 22 non-rotatably coupled to the shaft 26 is rotationally displaced from the second closed position 34 and into the first open position 30, the second end 96 of the biasing member 38 remains stationary in the slot of the gland 94 and the first end 82 of biasing member 38 will move with closure member 22, thereby loading biasing member 38.

As illustrated in FIGS. 3 and 4, the emergency shut-off valve assembly 10 further includes the valve actuation assembly 36 adapted to rotate the arm 24 and the closure member 22 between the first open position 30 and the second closed position 34. In some embodiments, the valve actuation assembly 36 may include a support bracket 106 that may be non-rotatably coupled—directly or indirectly—to a portion of the shaft 26 to couple the securement member 40 to the shaft 26. In the embodiment illustrated in FIG. 3, the valve actuation assembly 36 may include a handle assembly 108 directly coupled to the support bracket 106 and to a portion of the shaft 26, such as the second end 90 of the shaft 26 (shown in FIG. 2), such that a rotation of the handle assembly 108 about the shaft longitudinal axis 28 results in a corresponding rotation of the closure member 22, the arm 24, the shaft 26, the support bracket 106, and the securement member 40 about the shaft longitudinal axis 28 (see FIG. 2). Referring again to FIG. 3, the support bracket 106 may include a first portion 110 and a second portion 112. The first portion 110 may be planar or substantially planar and may be disposed normal or substantially normal to the shaft longitudinal axis 28. The first portion 110 may be elongated and rectangular, and a first end 114a of the first portion 110 may be coupled to a portion of the handle assembly 108. A second end 114b of the first portion 110 may be secured to a portion of a lateral edge 118 of the second portion 112. The second portion 112 may be planar or substantially planar and may be disposed normal or substantially normal to the first portion 110. The second portion 112 may be elongated and rectangular, and may extend between a first end 116a and a longitudinally-opposite second end 116b, and the portion of the lateral edge 118 may extend from the first end 116a towards the second end 116b. The first portion 110 and the second portion 112 may be integrally formed as a single unitary part or may be an assembly of two or more parts.

As illustrated in FIGS. 3 and 4, the valve actuation assembly 36 may also include the handle assembly 108 coupled to the support bracket 106 and to a portion of the shaft 26, such as the second end 90 of the shaft 26. The handle assembly 108 may include a handle bracket 120 and a grip portion 122 that may be secured to the handle bracket 120. The handle bracket 120 may include a first portion 124 and a second portion 126. The first portion 124 may be planar or substantially planar and may be disposed normal or substantially normal to the shaft longitudinal axis 28. The first portion 124 may be elongated and may have a first end 128a and a longitudinally opposite second end 128b, and the first end 114a of the first portion 110 of the support bracket 106 may be coupled to the first end 128a of the first portion 124 of the handle bracket 120. The first portion 110 of the support bracket 106 may be coupled the first end 128a of the first portion 124 of the handle bracket 120 in any suitable manner, such as by one or more mechanical fasteners, for example.

Referring to FIG. 3, the second portion 126 may be planar or substantially planar and may be disposed normal or substantially normal to the shaft longitudinal axis 28. The second portion 126 may be elongated and may extend along a longitudinal axis that is perpendicular to a longitudinal axis that extends through the first portion 124. The second portion 126 may have a first end 130a and a longitudinally opposite second end 130b, and the first end 130a of second portion 126 may be disposed at or adjacent to the second end 128b of the first portion 124. The first portion 124 and the second portion 126 may be integrally formed as a single unitary part or may be an assembly of two or more parts. The grip portion 122 may be secured to all or a portion of the second portion 126 of the handle bracket 120, and the grip portion 122 may be sized to allow a user to firmly grasp the second portion 126 of the handle bracket 120 to rotate the handle bracket about the shaft longitudinal axis 28.

As would be understood by one having ordinary skill in the art, the handle bracket 120 may be directly or indirectly coupled to the shaft 26 in any manner that allows a rotation of the handle bracket 120 about the shaft longitudinal axis 28 to rotate the shaft 26 about the shaft longitudinal axis 28. For example, as shown in FIG. 3, an aperture (not shown) may be formed in the first portion 124 between the first end 128a and the second end 128b, and a threaded member 131 may be received through the aperture to secure the handle bracket 120 and a cylindrical lug 132 (directly or indirectly) to the second end 90 of the shaft 26 (see FIG. 2).

As illustrated in FIGS. 3 and 4, the valve actuation assembly 36 may also include the securement member 40 that may be non-rotatably coupled to the shaft 26 such that when the shaft 26 rotates about the shaft longitudinal axis 28, the securement member 40 also rotates about the shaft longitudinal axis 28. As illustrated in FIG. 3, the securement member 40 may be coupled to the support bracket 106, and, more particularly, to a portion of the second portion 112 between the first end 116*a* and the second end 116*b*. The securement member 40 may have any suitable shape to allow the contact surface 44 of the securement member 40 to maintain suitable magnetic engagement with the contact surface 46 of the electromagnet 42 such that the closure member 22, the arm 24, and the shaft 26 are maintained in the first open position 30 against the rotational force provided by the biasing member 38. For example, as illustrated in FIG. 5A, the securement member 40 may have the shape or a disc that is symmetrical about a center axis 134, and the center axis 134 may be normal to the plane of the second portion 112 of the support bracket 106. As illustrated in FIG. 5C, the contact surface 44 may be planar or substantially planar and may be normal to the center axis 134. A cylindrical end wall 136 may outwardly extend from a perimeter edge of the contact surface 44, and a beveled surface 137 may extend from an end of the end wall 136 towards a planar intermediate surface 138 that is offset from the contact surface 44 along the center axis 134. A cylindrical boss end surface 140 extends from the intermediate surface 138 along the center axis 134 away from the contact surface 44, and a planar boss top surface 142 inwardly extends normal to the center axis 134 from an end portion of the boss end surface 140. A threaded bore 143 extends along the center axis 134 and through the entire securement member 40 from the boss top surface 142 to the contact surface 44. The boss top surface 142, the intermediate surface 138, and the contact surface 44 are all parallel and normal to the center axis 134, and the end wall 136, the beveled surface 137, and the boss end surface 140 are all symmetrically-formed about the center axis 134. A diameter of the threaded bore 143 may be less than a diameter D1 of the boss end surface 140. A diameter D2 of the end wall 136 may be greater than the diameter D1 of the boss end surface 140, and the diameter D2 of the end wall 136 may be approximately three times greater than the diameter D1 of the boss end surface 140.

The securement member 40 may be coupled to the support bracket 106 in any suitable manner. For example, as illustrated in FIG. 5A, an aperture 144 may be formed in the second portion 112 of the support bracket 106 between the first end 116*a* and the second end 116*b*, and the boss end surface 140 of the securement member 40 may be received into the aperture 144. A disk shaped and planar retainer 146 having a central aperture 147 may also have a bottom surface 150 that contacts the boss top surface 142 and a threaded member 148 may be disposed through the central aperture 147 and into engagement with the threaded bore 143 of the securement member 40 to removably secure the securement member 40 to the support bracket 106. One or more washers 151 may be disposed around the threaded member 148 and between the retainer 146 and an enlarged head of the threaded member 148.

So configured, as illustrated in FIG. 5A, the aperture 144 may have a diameter D3 that is slightly greater (e.g., 3% to 10% greater) than the diameter D1 (see FIG. 5C) of the boss end surface 140 such that the boss end surface 140 is received into the aperture 144 and such that an inner surface 149 of the second portion 112 of the support bracket 106 may be adjacent to or in contact with the intermediate surface 138 of the securement member 40. Accordingly, a first circumferential gap G1 may exist between a surface of the second portion 112 of the support bracket 106 that defines the aperture 144 and the boss end surface 140, thereby allowing the securement member 40 to radially move within the aperture 144. In addition, a height H (see FIG. 5C) of the boss end surface 140 along the center axis 134 may be slightly greater (e.g., 3% to 10% greater) than a thickness T of the second portion 112 of the support bracket 106 such that, with the bottom surface 150 of the retainer 146 in contact with the boss top surface 142, a second axial gap G2 exists between an outer surface 152 of the second portion 112 of the support bracket 106 and the bottom surface 150 of the retainer 146. The second axial gap G2 allows for relative axial motion (i.e., movement along the center axis 134) between the securement member 40 and the second portion 112 of the support bracket 106. Thus, the first circumferential gap G1 and/or the second axial gap G2 allow the contact surface 44 of the securement member 40 to adjust its position to fully engage the contact surface 46 of the electromagnet 42 when the closure member 22, the arm 24, and the shaft 26 are in the first open position 30.

Figure 6A:
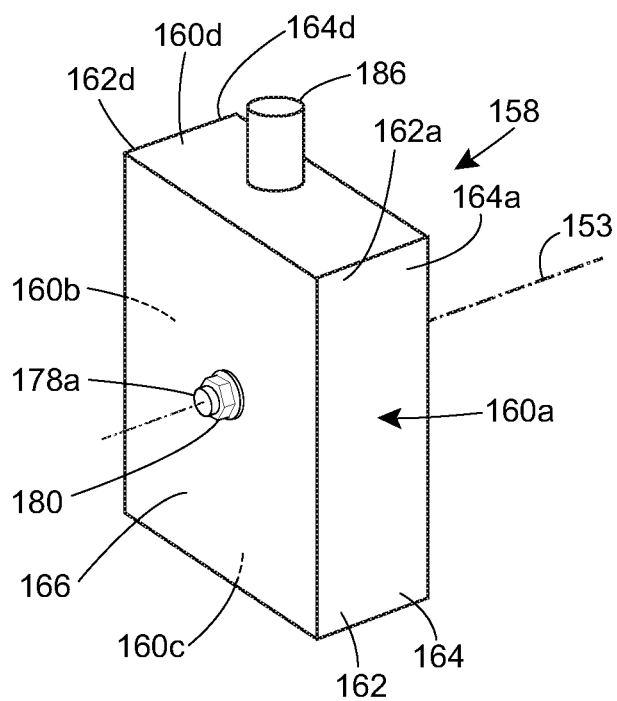
FIG. 6A is a perspective view of an embodiment of an housing for the electromagnet.

As illustrated in FIGS. 3, 4, 5A, and 5B, the valve actuation assembly 36 also includes an electromagnet 42 adapted to generate a first magnetic force in a first state and a second magnetic force in a second state, and the first magnetic force may be greater than the second magnetic force. The electromagnet 42 may have any suitable shape to generate the first and second magnetic forces. For example, as illustrated in FIG. 6A, the electromagnet 42 may have the shape of a cylinder that extends along a longitudinal axis 153, and the electromagnet 42 may have a first end 154*a* and a longitudinally-opposite second end 154*b*. The contact surface 46 of the electromagnet 42 may be disposed at or adjacent to the first end 154*a* of the electromagnet 42, and the contact surface 46 of the electromagnet 42 may be planar or substantially planar and may be normal to the longitudinal axis 153. One or more grooves, ridges, or other features may be formed in the contact surface 46 of the electromagnet 42 to improve contact between the contact surface 46 of the electromagnet 42 and the contact surface 44 of the securement member 40. A cylindrical side surface 156 of the electromagnet 42 may have a diameter that is smaller than the diameter D2 (see FIG. 5C) of the end wall 136 of the securement member 40.

As illustrated in FIGS. 4 and 5A, the electromagnet 42 may be in a fixed position relative to the valve body 12 and may be disposed in any suitable location to allow the contact surface 44 of the securement member 40 to be in contact with and magnetically coupled to the contact surface 46 of the electromagnet 42 when the closure member 22, the arm 24, and the shaft 26 are in the first open position 30. Also in the first open position 30, the longitudinal axis 153 of the electromagnet 42 may be coaxially aligned or substantially coaxially-aligned with the center axis 134 of the securement member 40.

Figure 6C:
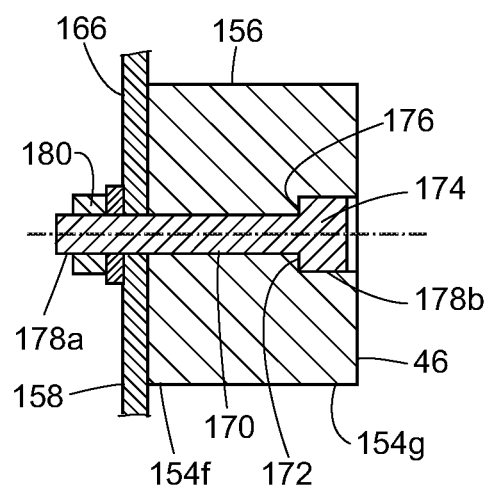
FIG. 6C is a side view of an embodiment of an electromagnet.
Figure 6B:
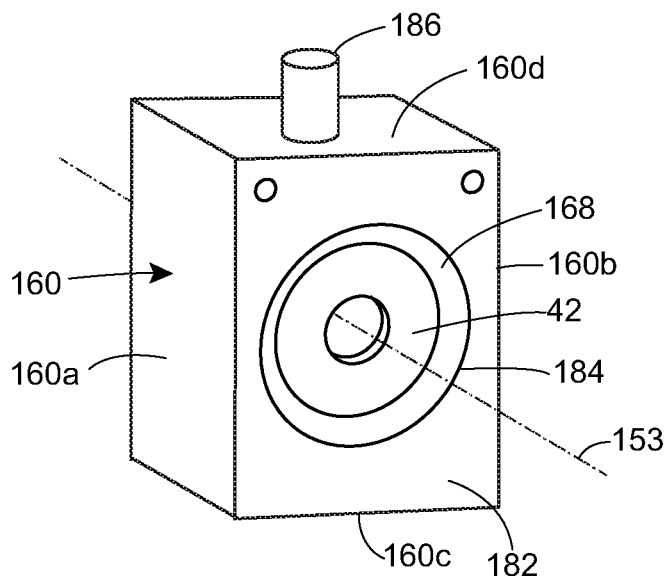
FIG. 6B is a further perspective view of the embodiment of FIG. 6A.

In some embodiments, the electromagnet 42 may be directly or indirectly coupled to the valve body 12, such an external portion of the valve body 12 (i.e., not within the interior portion 59 of the valve body 12). For example, as illustrated in FIGS. 3 and 4, the electromagnet 42 may be coupled to a housing 158 that may itself be directly or indirectly coupled to the valve body 12. Referring to FIGS. 6A and 6B, the housing 158 may form a partial enclosure and may have one or more side walls 160 that are generally aligned with the longitudinal axis 153 of the electromagnet 42, and the one or more side walls 160 may cooperate to laterally surround the side surface 156 of the electromagnet 42. In some embodiments, the one or more side walls 160 may include four side walls 160a-160d, the four side walls 160a-160d having two planar parallel first walls 160a, 160b, and two parallel planar second walls 160c, 160d that are each normal to the first walls 160a, 160b. The first walls 160a, 160b may be parallel to first portion 110 of the support bracket 106. Each of the one or more side walls 160 may have a first end 162 and a second end 164 in an opposite direction along the center axis 134. For example, each of the side walls 160a-d may have a first end 162a-d and a second end 164a-d.

Still referring to FIGS. 6A and 6B, a top wall 166 may be disposed at or adjacent to the first end 162 of the side walls 160, and the top wall 166 may have any suitable shape. For example, the top wall 166 may be planar and be normal to each of the four side walls 160a-160d. As illustrated in FIG. 3, the electromagnet 42 may be least partially disposed within an interior portion 168 formed by the one or more side walls 160 and the top wall 166. As shown in FIG. 6C, the electromagnet 42 may have a central bore 170 having a shoulder 172, and an elongated mounting member 174 may be disposed within the central bore 170. A shoulder 176 on the mounting member 174 may engage the shoulder 172 of the central bore 170, and a first end portion 178a may extend through an aperture in the top wall 166 and beyond the top wall 166. A threaded portion of the first end portion 178a may receive a nut 180 to secure the electromagnet 42 to the top wall 166 of the housing 158 such that the first end 154a of the electromagnet 42 is adjacent to the second end 164 of the one or more side walls 160 (see FIG. 3), such as the second end 164a-d of the four side walls 160a-d. In addition, with reference to FIG. 6C, a second end portion 178b of the mounting member 174 may be disposed within the central bore 170 and adjacent to the contact surface 46 of the electromagnet 42. As illustrated in FIGS. 3 and 6B, a bottom wall 182 may be secured to the one or more side walls 160 at or adjacent to the second end 164. For example, the bottom wall 182 may be secured to the second end 164a-d of the four side walls 160a-d. The bottom wall 182 may be planar and may be planar and may have an aperture 184 that may be greater than the diameter of the cylindrical side surface 156 of the electromagnet 42 and the diameter D2 (see FIG. 5C) of the end wall 136 of the securement member 40. As illustrated in FIGS. 3 and 6A, one or more of the side walls 160 may have an aperture that receives a cylindrical connector 186, and the connector 186 may be waterproof. The connector 186 may be adapted to receive a cable (not shown) for cutting power to the electromagnet 42 or may be adapted to receive one or more wires 187 (shown schematically in FIG. 5A) that may be connected to a power source (not shown) and that may be electrically coupled to the electromagnet 42 in a known manner. The switch 48 (illustrated in FIG. 5A) may be electrically coupled between the power source and the electromagnet 42 such that the electromagnet 42 generates a first magnetic force in a first switch position and a second magnetic force in a second switch position.

In order to protect the electromagnet 42 from rain, the housing 158 may be oriented such that rain does not enter the aperture 184 of the bottom wall 182. That is, with reference to FIGS. 6A and 6B, the housing 158, with the top wall 166 facing the rain, may be oriented such that the longitudinal axis 153 of the electromagnet 42 (and the side walls 160 aligned with the center axis 143) forms an angle between 0 degrees and 90 degrees with a vertical reference axis (with the ground being horizontal). Preferably, the longitudinal axis 153 of the electromagnet 42 forms an angle between 0 degrees and 10 degrees with the vertical reference axis. So positioned, and with the second portion 112 of the support bracket 106 covering the aperture 184 of the bottom wall 182 when the contact surface 44 of the securement member 40 is in contact with and magnetically coupled to the contact surface 46 of the electromagnet 42 (as illustrated in FIG. 4), the electromagnet 42 is protected from rain and ambient debris.

In some embodiments, a latch box 190 may be directly or indirectly coupled to the valve body 12. For example, as illustrated in FIGS. 3 and 4, the latch box 190 may be disposed adjacent to and/or coupled to the housing 158 that may itself be directly or indirectly coupled to the valve body 12. The latch box 190 may be an enclosure that may protect a connection between the valve body 12 and/or an electromagnetic control system 192, shown schematically in FIG. 5A. The electromagnetic control system 192 may be a control interface between the electromagnet 42 and a remote computer (not shown) or may be an independent control system for the electromagnet 42. In some embodiments, the switch 48 and the power source (not shown) may be in communication with the electromagnetic control system 192. Referring again to FIG. 3, a torsional spring 194 may have a first end secured to a portion of the latch box 190 (such as a gap between the latch box 190 and the housing 158) and a second end secured to a portion of the support bracket 106 and/or handle assembly 108, such as a portion of the lug 132.

When the electromagnet 42 is in a first state, the electromagnet 42 generates a first magnetic force. With the electromagnet 42 in this first state, the grip portion 122 of the handle assembly 108 is rotated about the shaft longitudinal axis 28 against a rotation force provided by the biasing member 38 (and, in some embodiments, also against a rotation force provided by the torsional spring 194) such that the contact surface 44 of the securement member 40 is in contact with and magnetically coupled to the contact surface 46 of the electromagnet 42, as illustrated in FIG. 4. So configured, the closure member 22, the arm 24, and the shaft 26 are in the first open position 30, as illustrated in FIG. 1. Because the moment that results from the first magnetic force between the contact surface 44 of the securement member 40 and the contact surface 46 of the electromagnet 42 is greater than the opposing moment provided by the biasing member 38, the closure member 22, the arm 24, and the shaft 26 are maintained in the first open position 30 as long as the electromagnet 42 is maintained or substantially maintained in the first state. However, when the electromagnet 42 is changed from the first state to the second state, such as by actuating the switch 48 by a user, the second magnetic force acting on the securement member 40 is not strong enough to resist the rotational force provided by the biasing member 38, and the biasing member 38 rotates the arm 24, the closure member 22, and the shaft 26 into the second closed position 30 illustrated in FIGS. 3 and 7. In some embodiments, the second magnetic force may be negligible.

One having ordinary skill in the art would recognize that the disclosed configuration allows a user to nearly instantaneously cut off fluid flow through the valve body 12 by the actuation of the switch 48, which may by remotely activated, for example. The electromagnet 42 may also be changed from the first state to the second state automatically without user interventions, such as by the loss of power supplied to the electromagnet 42. One having ordinary skill in the art would understand that the valve actuation assembly 36 improves safety by automating the cut-off process and by simplifying the triggering of the cut-off process. One having ordinary skill in the art would also recognize that the valve actuation assembly 36 provides a compact actuation mechanism that is relatively simple in its operation, and a relatively low voltage can be used to maintain the electromagnet 42 in the first state.

Figure 8B:
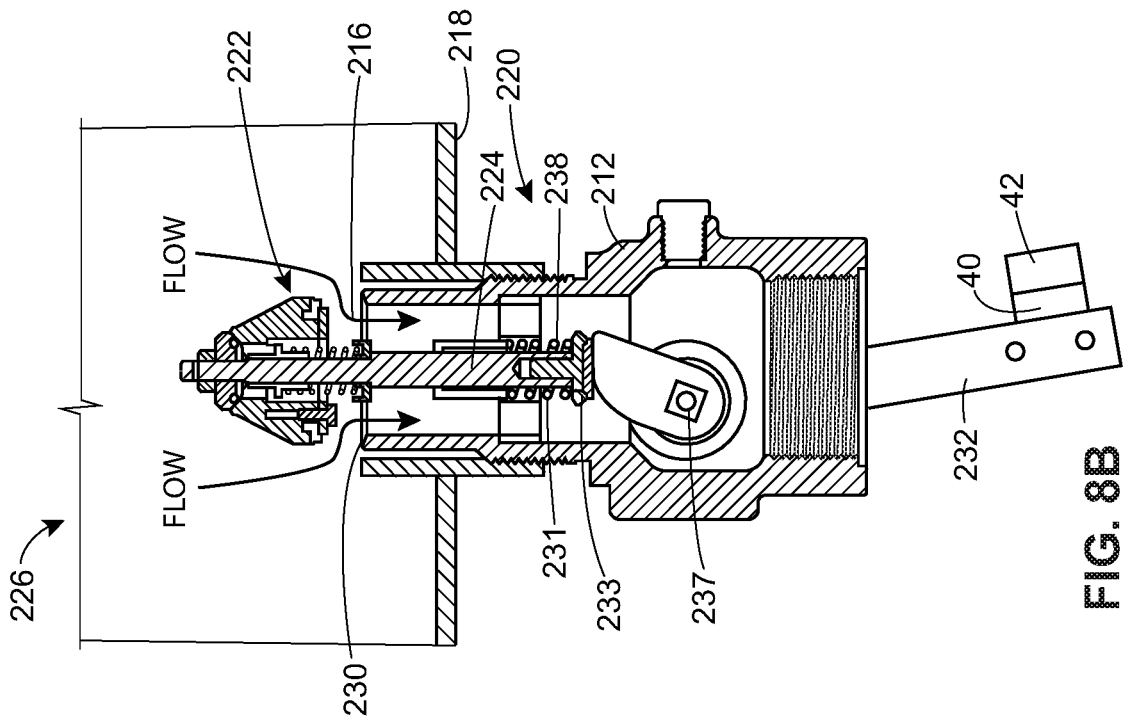
FIG. 8B is a side cross-sectional view of the embodiment of FIG. 8A in an open position.
Figure 8A:
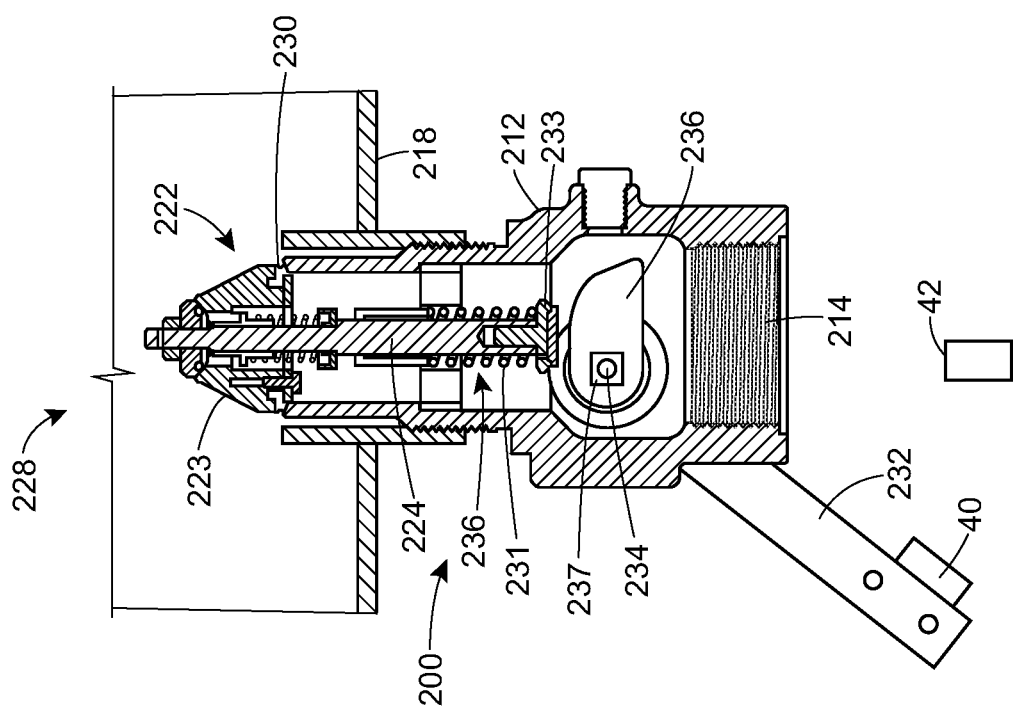
FIG. 8A is a side cross-sectional view of an embodiment of an internal valve in a closed position.

One of ordinary skill in the art would recognize that the valve actuation assembly 36 could be used on any valve that is capable of rotating between a first position, such as a first open position, and a second position, such as a second closed position. For example, the valve actuation assembly 36 may be used on an internal valve 200, such as that illustrated in FIGS. 8A, 8B, 9A, and 9B. Referring to FIGS. 8A and 8B, the internal valve 200 may have a valve body 212 having an inlet 214 and an outlet 216, and the inlet 214 may be in fluid communication with a source of pressurized fluid (not shown). The outlet 216 may be disposed in an interior volume of a storage tank 218. A closure member 222 may include a plug 223 and a shaft portion 224, and the closure member 222 may linearly displace from a first open position 226 (illustrated in FIGS. 8B and 9B) to a second closed position 228 (illustrated in FIGS. 8A and 9A), in which a sealing surface of the closure member 222 (i.e., of the plug 223) engages a valve seat 230 disposed at or adjacent to the outlet 216. Referring again to FIGS. 8A and 8B, a biasing member 238, such as a spring 231, acting on an end 233 of the shaft portion 224 of the closure member 222 may bias the closure member 222 into the second closed position 228. To open the valve (i.e., displace the closure member 222 from the second closed position 228 to the first open position 226), a handle 232 oriented normal to a cam axis 234 may be manually turned by a user to rotate a cam shaft 237 about the cam axis 234. A cam 236 coupled to the cam shaft 237 thereby acts on the end 233 of the shaft portion 224 to displace the end 233 of the shaft 224 towards the outlet 216, thereby displacing the closure member 222 away from and out of sealing engagement with the valve seat 230 such that the closure member 222 are in the first open position 226.

Figure 9B:
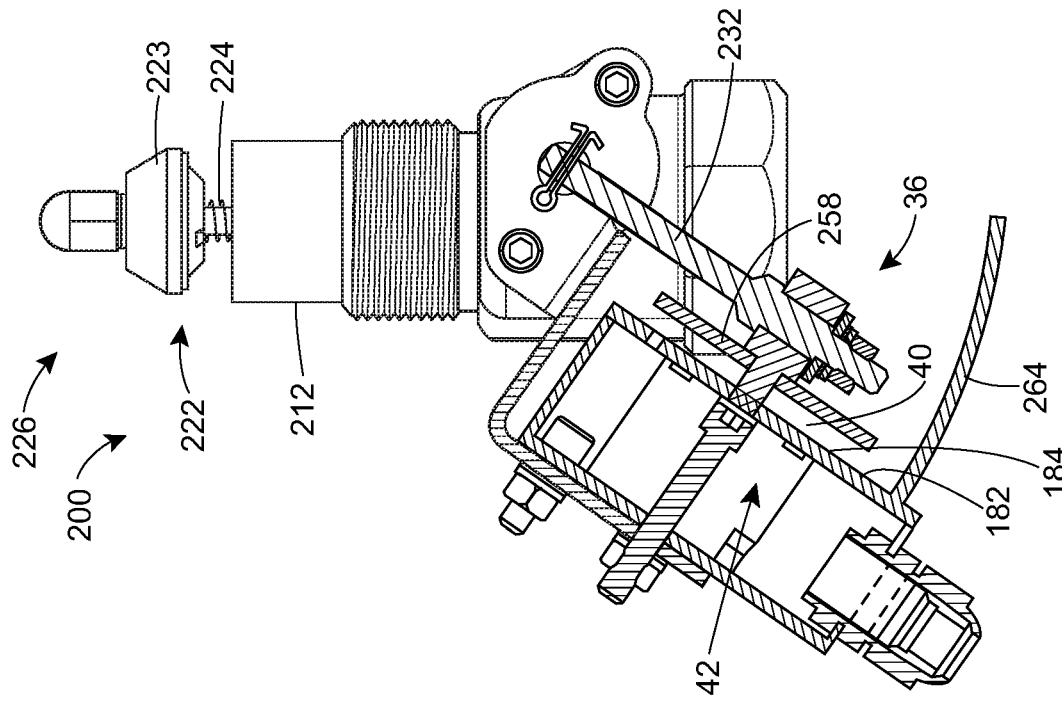
FIG. 9B is a side view of the embodiment of FIG. 9A in an open position.

As illustrated in FIGS. 8B and 9B, the valve actuation assembly 36 can maintain the shaft 224 and closure member 222 in the first open position 226 against the opposing force provided by the spring 231. Specifically, the securement member 40 may be coupled to the handle 232 and the electromagnet 42 may be coupled to the valve body 212, and the securement member 40 and the electromagnet 42 may act in the manner previously described. That is, the electromagnet 42 generates a first magnetic force in a first state and a second magnetic force in a second state, and the first magnetic force is greater than the second magnetic force. In the first state, the contact surface 44 of the securement member 40 is in contact with and magnetically coupled to the contact surface 46 of the electromagnet 42 such that the closure member 22 and the arm 24 are maintained in the first open position 226 against the force provided by the spring 231. In the second state, the closure member 222 is displaced into the second closed position 34 by the force provided by the spring 231.

Figure 10:
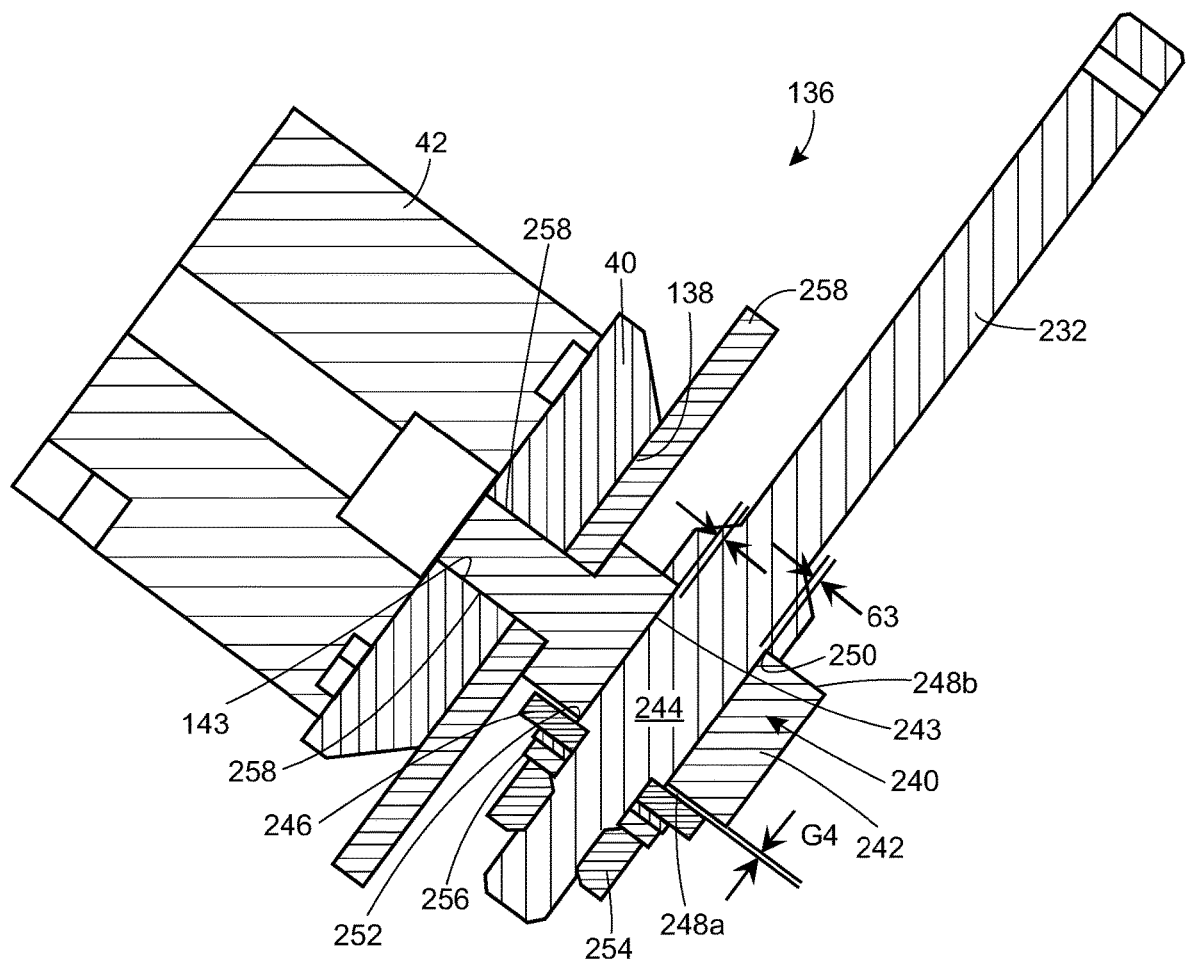
FIG. 10 is a side cross-sectional view of an embodiment of an electromagnet and a securement member of an embodiment of an internal valve in an open position.

The closure member 42 may be secured to the handle 232 in any suitable manner. For example, as illustrated in FIG. 10, the closure member 42 may be coupled to a handle adaptor 240 that may be coupled to an end or adjacent to an end of the handle 232, and the handle adaptor 240 may include a collar 242 having a cylindrical bore 243 that receives a cylindrical portion 244 of the handle 232. The diameter of the bore 243 is slightly larger (e.g., 3% to 10% larger) than the diameter of the cylindrical portion 244 of the handle 232 to provide a gap G3 allows the for movement between the securement member 40 and the handle 232 to allow the contact surface 44 of the securement member 40 to fully engage the contact surface 46 of the electromagnet 42. A retainer 246 may be disposed at a first end 248a of the cylindrical portion 244 of the handle 232 and a shoulder 250 may be disposed at a second end 248b of the cylindrical portion 244 of the handle 232. The longitudinal distance between an inner surface of the retainer 246 and the shoulder 250 may be slightly greater (e.g., 3% to 10% greater) that a longitudinal length of the collar 242 of the handle adaptor 240, thus providing a gap G4 that allows for axial movement between the securement member 40 and the handle 232 to allow the contact surface 44 of the securement member 40 to fully engage the contact surface 46 of the electromagnet 42. The retainer 246 may be secured against a shoulder 252 by a nut 254 and washers 256. A threaded projection 258 of the handle adaptor 240 may be received into the threaded bore 143 of the securement member 40, and a plate cover 258 may be disposed between the intermediate surface 138 (or the boss top surface 142, if the embodiment of the securement member 40 has a boss top surface 142 and a boss end surface 140) of the securement member 40 and the collar 242. The plate cover 258 may have any suitable shape to substantially cover the aperture 184 in the bottom wall 182 of the housing 158 (see FIG. 9B).

Figure 9A:
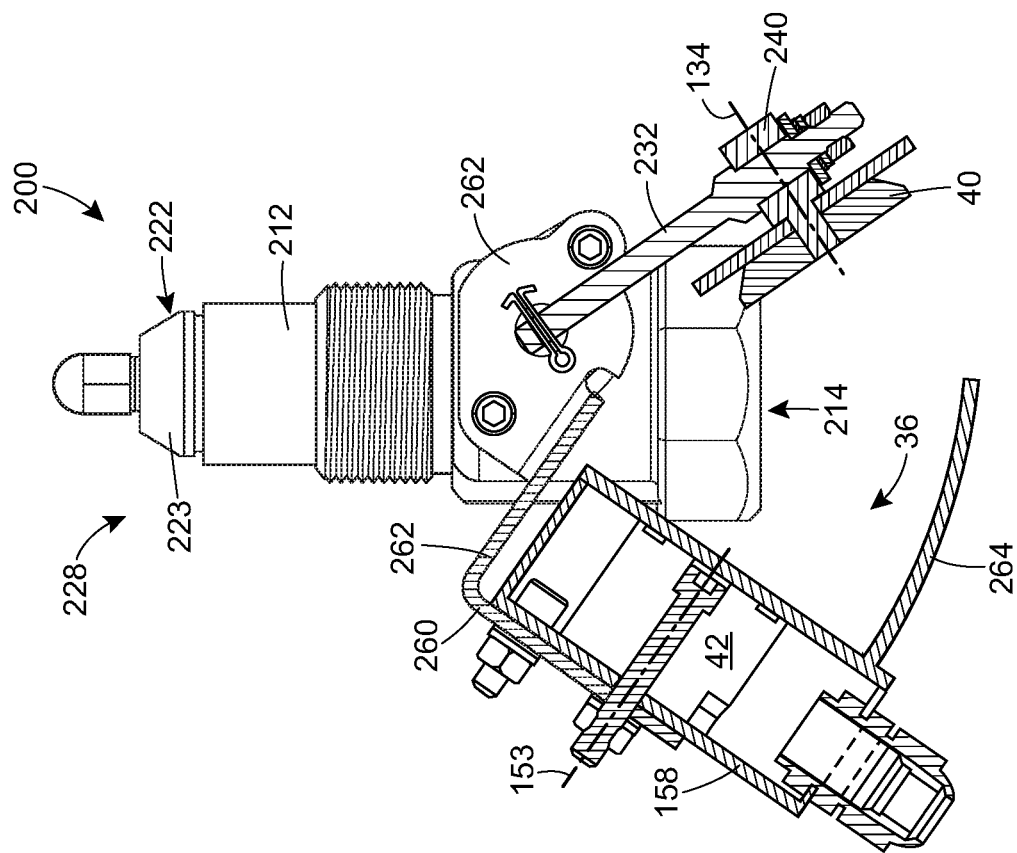
FIG. 9A is a side view of an embodiment of an internal valve in a closed position.

The housing 158 and electromagnet 42 may be secured to (or relative to) the valve body 212 in any suitable manner. For example, as illustrated in FIGS. 9A and 9B, the housing 158 and electromagnet 42 may be mounted to a flange portion 260 that may be a portion of a support bracket 262 that may be secured to the valve body 212. The flange portion 260 may be oriented such that the contact surface 44 of the securement member 40 is in contact with and magnetically coupled to the contact surface 46 of the electromagnet 42 when the closure member 222 is in the first open position 226. Also in the first open position 226, the longitudinal axis 153 of the electromagnet 42 may be coaxially aligned or substantially coaxially-aligned with the center axis 134 of the securement member 40. A curved rain shield 264 may be secured to the bottom wall 182 of the housing 158 to further cover and shield the aperture 184 in the bottom wall 182 of the housing 158.

One having ordinary skill in the art would recognize that the disclosed configuration allows a user to nearly instantaneously cut off fluid flow through the valve body 212 and into the storage tank 218 by, for example, the actuation of the switch 48 in the manner previously described. Also as previously explained, the electromagnet 42 may also be changed from the first state to the second state automatically without user interventions, such as by the loss of power supplied to the electromagnet 42. One having ordinary skill in the art would understand that the valve actuation assembly 36 in this further embodiment also improves safety by automating the cut-off process and by simplifying the triggering of the cut-off process.

While various embodiments have been described above, this disclosure is not intended to be limited thereto. Variations can be made to the disclosed embodiments that are still within the scope of the appended claims.

What is claimed is:

1. An emergency shut-off valve assembly, comprising:
 a valve body defining an inlet, an outlet, and a fluid passageway between the inlet and the outlet;

a valve closure assembly positioned at least partially within the valve body, the valve closure assembly comprising:
a shaft rotatably coupled to the valve body, the shaft having a shaft longitudinal axis;
an arm coupled to the shaft;
a closure member coupled to the arm; and
a biasing member coupled to the arm or the closure member,
wherein the arm, the closure member, and the shaft rotate about the shaft longitudinal axis from a first open position in which the closure member is offset from a valve seat coupled to the valve body and a second closed position in which the closure member sealingly engages the valve seat such that fluid is prevented from flowing through the fluid passageway from the inlet to the outlet; and
a valve actuation assembly adapted to rotate the arm and closure member from the first open position to the second closed position, the valve actuation assembly comprising:
a handle having a grip portion;
a securement member;
a support bracket having a first end fixed to the handle and a second end fixed to the securement member; and
an electromagnet adapted to generate a first magnetic force in a first state and a second magnetic force in a second state, the first magnetic force being greater than the second magnetic force,
wherein in the first state, a contact surface of the securement member is in contact with and magnetically coupled to a contact surface of the electromagnet such that the closure member, the arm, and the shaft are maintained in the first open position against a rotational force provided by the biasing member, and
wherein in the second state, the closure member, the arm, and the shaft are rotated into the second closed position by the rotational force provided by the biasing member;
wherein the shaft is coupled to the valve actuation assembly at a portion thereof disposed between the grip portion of the handle and the securement member, and wherein a rotation of the handle rotates the arm, the closure member, and the shaft from the second closed position to the first open position and rotates the contact surface of the securement member into contact with the contact surface of the electromagnet.

2. The emergency shut-off valve assembly of claim 1, wherein the securement member is disposed external to the valve body.

3. The emergency shut-off valve assembly of claim 1, wherein the biasing member is a torsion spring disposed around a portion of the shaft.

4. The emergency shut-off valve assembly of claim 1, further comprising a switch electrically coupled to the electromagnet, wherein a first switch position corresponds to the first state of the electromagnet and a second switch position corresponds to the second state of the electromagnet.

5. The emergency shut-off valve assembly of claim 1, wherein the electromagnet is coupled to the valve body and is disposed external to the valve body.

6. The emergency shut-off valve assembly of claim 1, wherein the second magnetic force is negligible.

7. A method of rotationally displacing a valve closure member within a valve body from a first open position to a second closed position, the method comprising:
generating a first magnetic force by an electromagnet, the first magnetic force acting on a securement member coupled to a shaft that is coupled to the closure member to maintain the closure member in the first open position, wherein a biasing member acts on the shaft to tend to rotate the closure member into the second closed position;
generating a second magnetic force by the electromagnet that is less than the first magnetic force such that the biasing member acts on the shaft to rotate the closure member from the first open position to the second closed position;
actuating a switch electrically coupled to the electromagnet, wherein actuating the switch includes changing the switch from a first switch position that generates the first magnetic force to a second switch position that generates the second magnetic force; and
rotating a valve actuation assembly comprising the securement member, a handle having a grip portion, and a support bracket having a first end fixed to the handle and a second end fixed to the securement member, the shaft being coupled to the valve actuation assembly at a portion thereof disposed between the grip portion of the handle and the securement member, such that rotation of the valve actuation assembly causes a contact surface of the electromagnet to contact a contact surface of the securement member when the electromagnet generates the first magnetic force to maintain the closure member in the first open position.

8. The method of claim 7, wherein the biasing member is a torsion spring disposed around a portion of the shaft.

9. The method of claim 7, wherein the electromagnet and securement member are coupled to the valve body and disposed external to the valve body.

10. The method of claim 7, wherein the second magnetic force is negligible.

* * * * *

UNITED STATES PATENT AND TRADEMARK OFFICE
CERTIFICATE OF CORRECTION

| | | |
|---|---|---|
| PATENT NO. | : 10,663,070 B2 | Page 1 of 2 |
| APPLICATION NO. | : 14/828124 | |
| DATED | : May 26, 2020 | |
| INVENTOR(S) | : Chen Jing et al. | |

It is certified that error appears in the above-identified patent and that said Letters Patent is hereby corrected as shown below:

In the Specification

At Column 2, Lines 38-39, "an housing" should be -- a housing --.

At Column 3, Line 50, "may by" should be -- may be --.

At Column 4, Line 14, "Referring" should be -- referring --.

At Column 4, Line 34, "aperture a second" should be -- aperture and a second --.

At Column 5, Lines 1-2, "emergency shut-off emergency shut-off valve" should be -- emergency shut-off valve --.

At Column 5, Line 19, "retainer 98" should be -- retaining plate 100 --.

At Column 5, Line 39, "may positioned" should be -- may be positioned --.

At Column 6, Line 39, "coupled the" should be -- coupled to the --.

At Column 8, Line 61, "such an" should be -- such as an --.

At Column 10, Line 59, "closed position 30" should be -- closed position 34 --.

At Column 10, Line 64, "may by" should be -- may be --.

At Column 11, Line 61, "closure member 42" should be -- closure member 222 --.

At Column 11, Line 63, "closure member 42" should be -- closure member 222 --.

Signed and Sealed this
Ninth Day of March, 2021

Drew Hirshfeld
*Performing the Functions and Duties of the
Under Secretary of Commerce for Intellectual Property and
Director of the United States Patent and Trademark Office*

At Column 12, Line 3, "allows the for" should be -- that allows for the --.

At Column 12, Line 19, "threaded projection 258" should be -- threaded projection --.